Patented Mar. 17, 1942

2,276,679

UNITED STATES PATENT OFFICE 2,276,679

CATALYST FOR THE SYNTHESIS OF AMMONIA

Giles Warren Abbott, Midland, Mich., assignor to The Dow Chemical Company, Midland, Mich., a corporation of Michigan No Drawing. Application August 2, 1940, Serial No. 350,122

6 Claims. (Cl. 252—230)

This invention concerns an improved catalyst for the reaction between hydrogen and nitrogen to form ammonia.

The synthesis of ammonia from hydrogen and nitrogen is usually carried out in the presence of a catalyst comprising iron of a certain form and any of a variety of oxides of other metals which serve as promoters to increase the catalytic activity of the iron. Such catalyst is employed in the form of porous granules or other shaped pieces of size sufficient to permit free gas flow through a bed of the same and to prevent the catalyst from being swept from the catalyst chamber by the gas. The activity and utility of the catalyst are dependent not only upon its chemical composition, but also upon its strength and porosity and upon the procedure and ingredients used in making it. The catalysts are usually prepared by oxidizing highly purified iron with oxygen to form ferroso-ferric oxide, $Fe_3O_4$, mixing the latter with the other metal oxides used as promoters, and electrolytically fusing the mixture in a bed of the same material. The porous fused mass thus obtained is crushed into pieces of suitable size and treated with hydrogen to reduce the iron oxide to metallic iron of the desired catalytic form. This usual method of preparing such catalyst is inconvenient and expensive to carry out and seldom produces a product of uniform porosity. Another, though less satisfactory, known method for preparing the catalyst is to admix the nitrates of the metals desired in the catalyst product and heat the mixture to decompose the nitrates and form a mass of the corresponding metal oxides, which may then be treated with hydrogen to obtain the catalyst product. Although a wide variety of metal oxides have been employed as promoters in such catalysts, U. S. Patent No. 1,844,963 discloses that a particularly active catalyst is obtained when a mixture of magnesium oxide and potassium oxide is compounded together with iron by either of the usual methods just described.

A co-pending application of S. B. Heath, Serial No. 350,151, filed concurrently herewith, discloses an improved method of making the catalysts which comprises admixing iron powder with any suitable promoter therefor, compacting the mixture into tablets or other pieces of convenient size, treating the compacted material with superheated steam at a temperature above 500° C., whereby the particles of each tablet become cemented together, apparently due to partial fusion of the mixture, and the iron is at the same time oxidized to ferroso-ferric oxide. The tablets are then treated with hydrogen as usual, thus obtaining the catalyst product in the form of tablets or other small pieces of substantially uniform porosity and of good strength and good catalytic activity. The porosity of the catalyst product is largely dependent upon the fineness of the starting materials and the pressure under which they are compacted prior to the treatment with steam; hence this method permits the production of a catalyst of desired porosity.

I have now found that an exceptionally active catalyst may be obtained by admixing iron powder with potassium silicate; a compound selected from the class consisting of silica and silicic acid; and with the oxides, hydroxides or carbonates of potassium and magnesium, or with other compounds which are readily decomposed by heat to form the oxides, compacting the mixture, and oxidizing the iron therein with superheated steam in accordance with the method of said co-pending application Serial No. 350,151. It is essential, however, that part, and only part, of the potassium and the silicon be introduced as a potassium silicate and that the remainder of these two elements be introduced as their respective oxides or as other compounds of the elements which are readily decomposed by heat to form the oxides. A less active catalyst is obtained when the mixture of starting materials contains all of the potassium and silicon in the form of a potassium silicate, or when it contains all of the potassium and silicon in the form of other compounds and initially is substantially free of potassium silicate. I have further found that the porosity and the apparent density of the catalyst are dependent not only upon the fineness of the starting materials and the pressure under which they are compacted, but also to a large extent upon the particular silicate of potassium used in the initial mixture. For instance, under otherwise similar conditions, the employment of $K_2SiO_3$ in the starting mixture results in the formation of a catalyst having finer pores and a far higher apparent density than is obtained when the potassium silicate initially employed is $K_2Si_4O_9$.

The new catalyst is prepared by mixing iron powder with potassium silicate, silicon dioxide or silicic acid; and with the oxides, hydroxides, carbonates, or nitrates of potassium and magnesium in proportions such that upon converting the iron to ferroso-ferric oxide and converting the other compounds present into corresponding metal oxides, the mixture will contain from 1.5 to 7 per cent by weight, preferably between 2.7 and 5 per cent, of magnesium oxide; from 0.5 to 2.5 per cent, preferably between 0.7 and 1.5 per cent, of potassium oxide; and from 0.3 to 2.5 per cent, preferably between 0.7 and 1.5 per cent, of silicon dioxide. Between 40 per cent and 70 per cent of each of the elements potassium and silicon is introduced in the form of a potassium silicate. The water-soluble ingredients may be introduced in aqueous solution or in solid form as desired. The solid ingredients are preferably employed as fine powders, e. g. of 100 mesh size or smaller. The major portion of the solid ingredients are preferably of particle size between 250 mesh and 400 mesh.

The mixture is then pressed or otherwise compacted into pieces, e. g. disks, briquettes, tablets, or pellets, etc., of convenient size. As an aid in compacting the mixture, it may be treated with a small amount of water and, if desired, with other binding agents such as sugar, molasses, gum arabic, etc. The pressure applied in compacting the mixture into pieces of desired size and shape may be only slight or may be a high pressure, depending upon the porosity desired in the final catalyst product. Pressures as low as 25 pounds and as high as 1000 pounds per square inch have satisfactorily been used.

The compacted mixture is treated with superheated steam at a reaction temperature between 500° and 1000° C. or higher, usually between 600° and 800° C., until at least 85 per cent of the iron has been oxidized and at least 60 per cent, and preferably all, of the iron is converted to ferrosoferric oxide. During this treatment with steam, the particles within each briquette of the mixture become firmly cemented together, due apparently to partial fusion occurring. Also, any metal nitrates and any magnesium carbonate initially employed are decomposed by the treatment into the corresponding metal oxides or hydroxides.

The porous briquettes or tablets, etc., obtained by the foregoing operations have good strength and do not crumble readily. They may be crushed, if necessary, into smaller pieces of size suitable for use in the synthetic ammonia process. They may be treated in the usual manner with hydrogen, or with a mixture of hydrogen and nitrogen, to reduce the iron oxide to metallic iron, thereby obtaining the porous material in catalytically active form.

The following table, which describes the results obtained in a series of experiments, illustrates certain of the advantages of the invention, but is not to be construed as limiting its scope. In each of the experiments, a mixture of the ingredients named was moistened with water and molded under a pressure of about 50 pounds per square inch into disks of about 2 inches diameter and ⅛ inch thickness. The iron powder employed in all of the experiments was of the same quality and the same fineness. The disks were placed in a steam chamber and were treated with superheated steam at a temperature of approximately 760° C. for about 14 hours. The oxidized disks were then cooled, crushed to form granules of size between 4 and 8 mesh and a portion of the granulated material was analyzed. The table gives the per cent by weight of iron oxides, magnesium oxide, potassium oxide, and silicon dioxide in each sample of oxidized material. Each granular material was charged into the catalyst chamber of an ammonia generator. The generator was then operated by passing a gaseous mixture of 1 part by volume of nitrogen and 3 parts hydrogen, which mixture also contained 3.5 per cent of ammonia, through the generator under a pressure of 4850 pounds per square inch at the normal rate of gas flow (i. e. 0.27 cubic ft. of gas per minute per 0.588 cubic in. catalyst at the temperature and pressure employed) for the generator. Tests to determine the activity of each catalyst were carried out at two different operating temperatures, i. e. 450° C. and 465° C. After operating for sufficient time to reduce the iron oxide and thereby render the porous iron-containing material catalytically active, the per cent by volume of ammonia in the gas leaving the generator was determined. The table gives the temperature at which each experiment was carried out and the per cent of ammonia in the gas issuing from the generator.

Table

| Run No. | Catalyst | | | | | | | NH₃ in exit gas when operating at— | |
|---|---|---|---|---|---|---|---|---|---|
| | Starting materials, grams | Analysis after oxidation | | | | | | 450° C. | 465° C. |
| | | Fe₃O₄ | Fe₂O₃ | MgO | K₂O | SiO₂ | | | |
| | | Percent | Percent | Percent | Percent | Percent | | Percent | Percent |
| 1 | Fe 60; 85% MgO 6; K₂SiO₃ 2.25 | 93.27 | 0 | 4.54 | 1.10 | 1.09 | | 8.9 | 8.4 |
| 2 | Fe 60; 85% MgO 6; K₂CO₃ 1½H₂O 1.35; 90% SiO₂ 0.8 | 74.68 | 18.67 | 4.14 | 1.04 | 1.47 | | 10.4 | 11.3 |
| 3 | Fe 60; MgO 4.43; K₂CO₃ 2.26; SiO₂ 0.75 | 94.58 | 0 | 3.37 | 1.19 | 0.86 | | 9.8 | 10.1 |
| 4 | Fe 60; MgO 6.38; K₂CO₃ 0.743; SiO₂ 0.231 | 94.92 | 0 | 3.78 | 0.97 | 0.33 | | 10.3 | 10.5 |
| 5 | Fe 60; 95% MgO 4.43; KNO₃ 0.34; SiO₂ 0.36; K₂SiO₃ 1.0 | *87.4 | 4.75 | 2.71 | 1.10 | 1.19 | | 11.6 | 12.2 |
| 6 | Fe 60; 85% MgO 5; K₂CO₃ 1½H₂O 0.4; 90% SiO₂ 0.4; K₂SiO₃ 1.0 | 93.88 | 0 | 3.63 | 1.05 | 1.44 | | 12.7 | 13.2 |

* Less than 3% of FeO also present.

Runs 1—4 of the table describe the results obtained when using catalysts which, as far as chemical analysis is concerned, correspond to those of the invention, but which are not prepared in accordance with the invention. Runs 2—4 demonstrate that, when the same procedure and kinds of starting material are used in preparing the catalysts, the proportions of Fe₃O₄, MgO, K₂O, and SiO₂ in the oxidized product may be varied considerably without appreciable change in the catalytic activity. On the other hand, run 1 and also runs 5 and 6 show that a change in the kinds of starting materials used to supply the potassium and the silicon content of the catalyst alter the activity of the latter very markedly. Runs 5 and 6 describe the results obtained when using a catalyst prepared in accordance with the invention. Comparison of runs 5 and 6 with run 1 will show that the catalyst is far more active when the starting materials from which it is prepared include a potassium silicate, and either potassium oxide or a compound readily decomposed to form potassium oxide, than when the potassium and silicon of the catalyst are supplied entirely by means of a potassium silicate as a starting material. From comparison of runs 5—6 with runs 2—4, it will be seen that a catalyst prepared in accordance with the invention from starting materials which include a potassium silicate, silica, and potassium oxide or a compound readily decomposed thereto is more active than one prepared from similar starting materials, except that the potassium silicate is omitted.

Other compounds in addition to those hereinbefore specified may be employed in making exceptionally active catalysts in accordance with the invention. For instance, small proportions, e. g., up to 5 per cent by weight, of other metal oxide promoters such as aluminum oxide, titanium oxide, or molybdenum oxide, etc., may be used in admixture with the starting materials required by the invention in preparing the new catalysts. By compacting the mixture, and treating it successively with superheated steam and hydrogen, there is obtained a catalyst containing iron, magnesium oxide, potassium oxide, and silicon dioxide and also the other metal oxides used as starting materials.

Other modes of applying the principle of the invention may be employed instead of those explained, change being made as regards the compositions herein disclosed, provided the steps and the compounds stated by any of the following claims or the equivalent of such stated steps and compounds be employed.

I therefore particularly point out and distinctly claim as my invention:

1. A catalyst for the reaction between hydrogen and nitrogen to form ammonia, which catalyst comprises iron, magnesium oxide, a basic potassium compound, and silicon dioxide, and is prepared by mixing iron powder with minor proportions of a potassium silicate, a compound selected from the class consisting of silicon dioxide and silicic acid, a compound selected from the class consisting of magnesium oxide and compounds which are readily decomposed by heat to form magnesium oxide, and a compound selected from the class consisting of potassium oxide, potassium carbonate, and potassium compounds other than potassium silicate which are readily decomposed by heat to form potassium oxide, treating the mixture with superheated steam at a reaction temperature above 500° C. until at least 85 per cent of the iron is oxidized and at least 60 per cent of the iron is converted to ferroso-ferric oxide, and thereafter treating the mixture with hydrogen to reduce the iron oxide to metallic iron.

2. A catalyst for the reaction between hydrogen and nitrogen to form ammonia, which catalyst comprises iron, magnesium oxide, a basic potassium compound, and silicon dioxide, said catalyst being prepared by mixing iron powder with potassium silicate, a compound selected from the class consisting of silicon dioxide and silicic acid, a compound selected from the class consisting of magnesium oxide and magnesium compounds which are readily decomposed by heating to form magnesium oxide, and a compound selected from the class consisting of potassium oxide, potassium carbonate and potassium compounds other than potassium silicate which are readily decomposed by heat to form potassium oxide, the magnesium, potassium, and silicon compounds being employed in proportions such that when the iron present is converted into ferroso-ferric oxide the content of these metals, expressed as their oxides, shall be between 1.5 and 7 per cent by weight of magnesium oxide, between 0.5 and 2.5 per cent of potassium oxide and between 0.3 and 2.5 per cent of silicon dioxide, compacting the mixture, treating the compacted mixture with superheated steam at a temperature between about 600° and 800° C. until at least 85 per cent of the iron is oxidized and at least 60 per cent of the iron is converted into ferroso-ferric oxide and thereafter treating the mixture with hydrogen to reduce the iron oxide to metallic iron.

3. A catalyst for the reaction between hydrogen and nitrogen to form ammonia which catalyst comprises iron, magnesium oxide, potassium oxide, and silicon dioxide, and is prepared by mixing iron powder with minor proportions of potassium silicate, silicon dioxide, magnesium and potassium oxide, compacting the mixture and treating the compacted mixture with superheated steam at a reaction temperature above 500° C. until at least 85 per cent of the iron is oxidized and at least 60 per cent of the iron is converted to ferroso-ferric oxide and thereafter treating the mixture with hydrogen to reduce the iron oxide to metallic iron.

4. A catalyst for the reaction between hydrogen and nitrogen to form ammonia, which catalyst comprises iron, magnesium oxide, potassium oxide, and silicon dioxide, and is prepared by mixing iron powder with a potassium silicate, silicon dioxide, magnesium oxide, and potassium oxide, the magnesium, potassium, and silicon compounds being employed in proportions such that when the iron is oxidized to ferroso-ferric oxide the content of these metals, expressed as their oxides, shall be between 2.7 and 5 per cent by weight of magnesium oxide, between 0.7 and 1.5 per cent of potassium oxide, and between 0.7 and 1.5 per cent of silicon dioxide, compacting the mixture, treating the compacted mixture with superheated steam at a temperature between about 600° and 800° C. until at least 85 per cent of the iron is oxidized and at least 60 per cent of the iron is converted into ferroso-ferric oxide, and thereafter treating the mixture with hydrogen to reduce the iron oxide to metallic iron.

5. A catalyst for the reaction between hydrogen and nitrogen to form ammonia, which catalyst comprises iron, magnesium oxide, a basic potassium compound, and silicon dioxide, and is prepared by mixing iron powder with a potassium silicate, a compound selected from the class consisting of silicon dioxide and silicic acid, a compound selected from the class consisting of magnesium oxide and compounds which are readily decomposed by heat to form magnesium oxide, and a compound selected from the class consisting of potassium oxide, potassium carbonate and potassium compounds other than potassium silicate which are readily decomposed by heat to form potassium oxide, the magnesium, potassium and silicon compounds being employed in proportions such that when the iron is oxidized to ferroso-ferric oxide the content of these metals expressed as their oxides, shall be between 1.5 and 7 per cent by weight of magnesium oxide, between 0.5 and 2.5 per cent of potassium oxide, and between 0.3 and 2.5 per cent of silicon dioxide, and the potassium silicate being employed in a proportion sufficient to supply between 40 and 70 per cent of the potassium and of the silicon in the mixture, compacting the mixture, treating the mixture with superheated steam at a reaction temperature above 500° C. until at least 85 per cent of the iron is oxidized and at least 60 per cent of the iron is converted to ferroso-ferric oxide, and thereafter treating the mixture with hydrogen to reduce the iron oxide to metallic iron.

6. A catalyst for the reaction between hydrogen and nitrogen to form ammonia, which catalyst comprises iron, magnesium oxide, potassium oxide, and silicon dioxide and is prepared by mixing iron powder with a potassium silicate, silicon dioxide, magnesium oxide and potassium oxide, the magnesium, potassium and silicon compounds being employed in proportions such that when the iron is oxidized to ferroso-ferric oxide the content of these metals, expressed as their oxides, shall be between 2.7 and 5 per cent by weight of magnesium oxide, between 0.7 and 1.5 per cent of potassium oxide and between 0.7 and 1.5 per cent of silicon dioxide, and the potassium silicate in the starting mixture being employed in a proportion sufficient to supply between 40 and 70 per cent of the potassium and of the silicon in the mixture, compacting the mixture, treating the latter with superheated steam at a temperature between about 600° and about 800° C. until at least 85 per cent of the iron is oxidized and at least 60 per cent of the iron is converted to ferroso-ferric oxide, and thereafter treating the mixture with hydrogen to reduce the iron oxide to metallic iron.

GILES WARREN ABBOTT.